Dec. 19, 1950  A. G. M. MICHELL ET AL  2,534,788
BEARING
Filed Aug. 23, 1944  4 Sheets-Sheet 1

ANTHONY GEORGE MALDON MICHELL
AUGUST JOHN SEGGEL
INVENTORS
BY E. W. Marshall
ATTORNEY

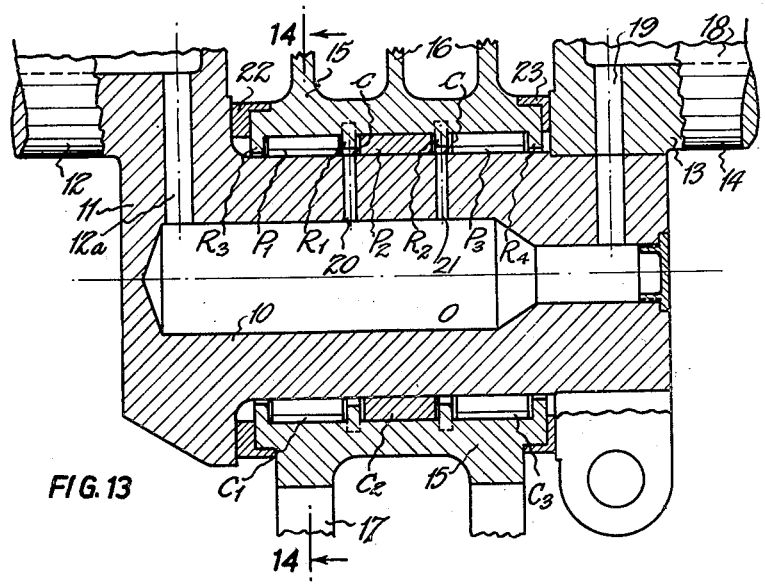

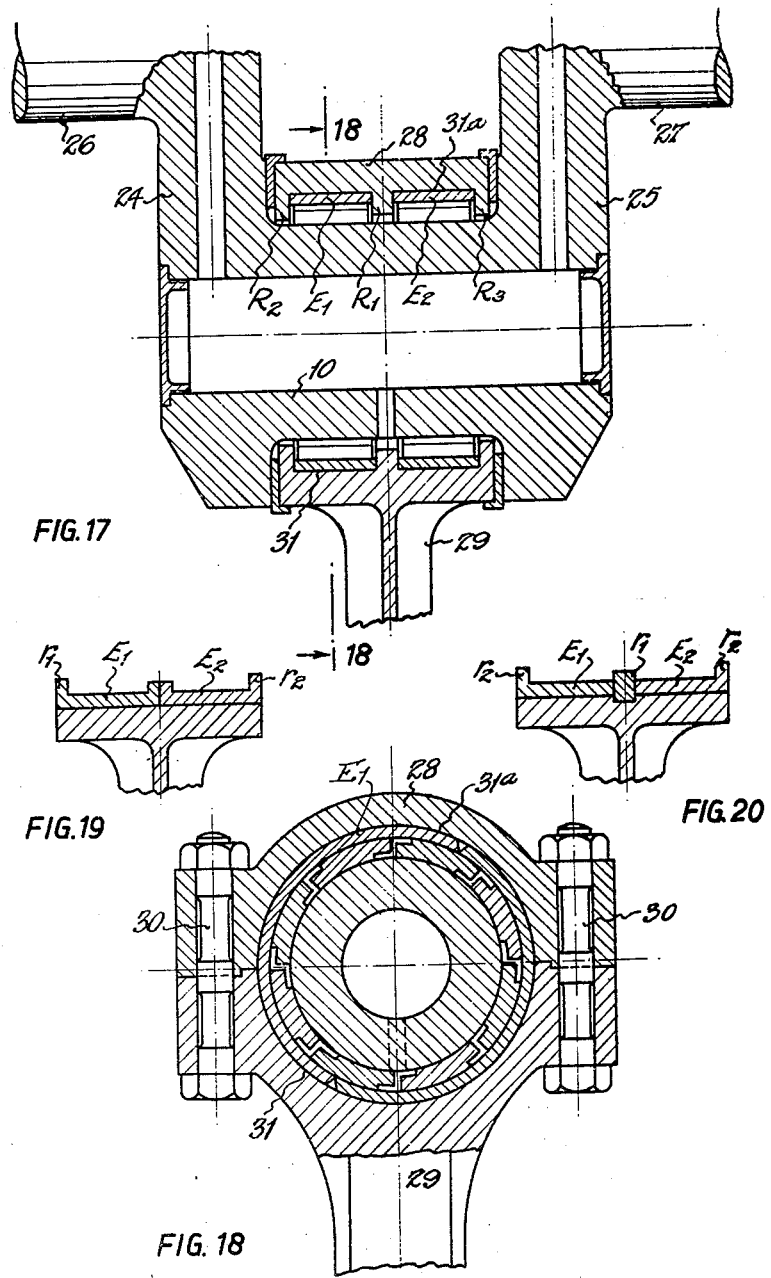

Dec. 19, 1950  A. G. M. MICHELL ET AL  2,534,788
BEARING
Filed Aug. 23, 1944  4 Sheets-Sheet 4
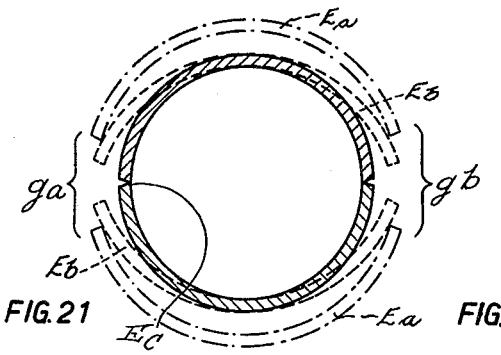
FIG. 21
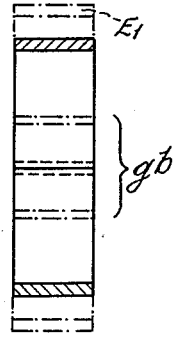
FIG. 22
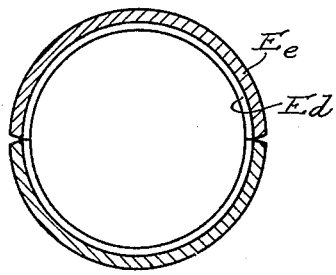
FIG. 23
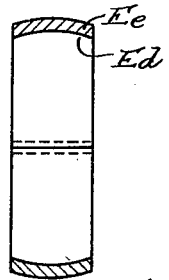
FIG. 26
FIG. 24
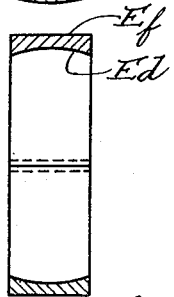
FIG. 27
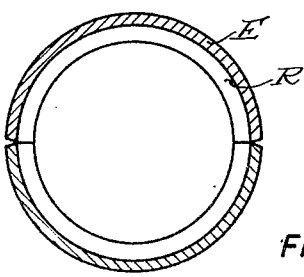
FIG. 25
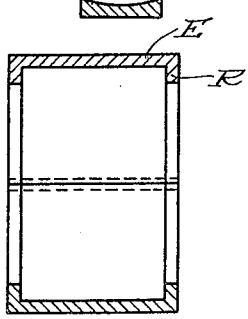
FIG. 28
ANTHONY GEORGE MALDON MICHELL
AUGUST JOHN SEGGEL
INVENTORS
BY E. W. Marshall
ATTORNEY Patented Dec. 19, 1950

2,534,788

UNITED STATES PATENT OFFICE 2,534,788

BEARING

Anthony George Maldon Michell and August John Seggel, Melbourne, Victoria, Australia Application August 23, 1944, Serial No. 550,786
In Australia September 28, 1943

5 Claims. (Cl. 308—73)

This invention relates to film-lubricated bearings of the type known as floating-pad bearings wherein pad-elements are located in annular series between opposed relatively rotating bearing members having the form of surfaces of revolution, and are free to rotate about the axis of the bearing and are free to slide over the surfaces of both of the bearing members with films of lubricant interposed between the faces of the pads and the adjacent surfaces of the opposed bearing members. The faces on the opposite sides of the pads are similar to one another and are relatively offset with respect to the middle radii through the pads. Special reference is made to the complete specification of the applicants' Patent No. 2,250,546, wherein bearings of this type are described and illustrated.

In bearings of this type as hitherto constructed all the pad-elements of the bearing have been similar, being in no way differentiated or distinguishable from one another in form or function. According to the present invention the pad-elements are divided into two or more groups which are differentiated either as to form or function, or in both of these respects. Depending upon the conditions of operation for which a bearing is intended, the pad-elements belonging to the various groups may be arranged in annular series between the opposed bearing members in different manners. Thus, all the pads of the various groups may be arranged in a single annular series or they may be separated into two or more annular series in each of which they may, or may not, be differentiated into sub-groups with respect to their form, location or function. When two or more annular series are used, they may be arranged either concentrically, or side by side axially, with respect to one another. In the latter case, spacing members, as hereinafter described, may be employed to retain each annular series of pads in properly spaced relation to the other or others. The differentiation of the pads into multiple groups provides for effective lubrication and efficient operation in cases when the relative motion of the bearing members may be at some times in one direction and at other times in the opposite direction, groups or pads suitably oriented for film lubrication with each direction of motion being employed either in a single or in multiple annular series. Particular examples of such arrangements are illustrated in the drawings and are hereinafter described with explanations of the purposes intended to be served in the various instances and the advantages to be obtained in comparison with known types of bearings.

It is desirable, in some cases, to form the outer of the two opposed relatively rotating bearing members in two or more parts, preferably separated on axial planes. For use in such cases, an elastic shell, or liner, adapted to be fitted within the separate parts of the outer bearing member, and to form the actual outer bearing surface, is illustrated and described as a subsidiary part of the invention.

In order to facilitate the assembly of the pad-elements when arranged in multiple annular series a suitable jig has been devised as hereinafter described.

Together with other purposes and advantages which will be made clear in the following description, the invention facilitates the production of floating-pad bearings in standard sizes for incorporation into machines of various kinds, and especially into existing machines in substitution for bearings of other types.

Several embodiments of the invention are illustrated in the accompanying drawings, wherein.

Figure 6:
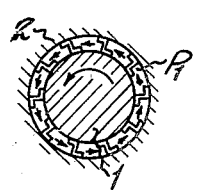
Figure 5:
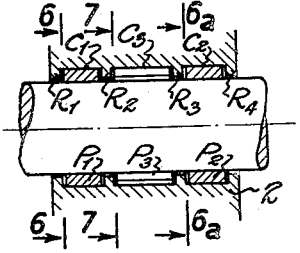
Fig. 5 is an axial section of a bearing having differentiated groups of pads adapting the journal to rotation in both directions.
Figure 7:
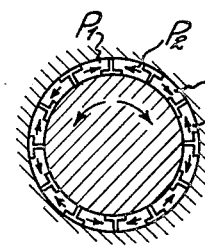

Figs. 6 and 7 are cross sections of the bearing shown in Fig. 5 on the lines 6—6, 6a—6a and 7—7 respectively.

Figure 8:
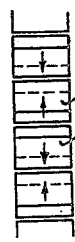
Figure 9:
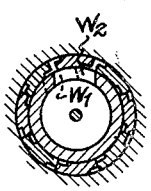

Figs. 8 and 9 are a transverse section and a developed view respectively of a bearing having pads differentiated into groups in different manner from Figs. 5, 6 and 7.

Figures 10, 11:
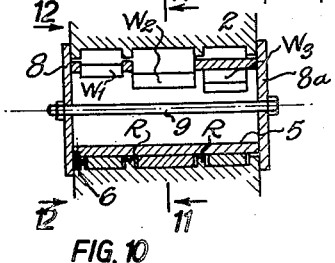

Fig. 10 is an axial section of means for facilitating the assembly of bearings of the type shown in Fig. 5.

Figure 12:

Figs. 11 and 12 are transverse sections taken on the lines 11—11 and 12—12 in Fig. 10.

Fig. 13 is an axial section of a bearing having three annular series of pads constructed in accordance with the invention and applied to a crank shaft assembly of well known construction.

Fig. 14 is a partial cross section on the line 14—14 in Fig. 13.

Fig. 15 is a developed view of the pads shown in Fig. 14.

Fig. 16 is a partially diagrammatic view illustrating certain features of the operation of a bearing such as that shown in Figs. 13 and 14.

Fig. 17 is an axial section of a bearing having two annular series of pads, made in accordance with the invention and applied to a crank pin journal formed integrally with opposed crank webs, the connecting rod big end in engagement with the journal being divided diametrically.

Fig. 18 is a cross section on the line 18—18 of Fig. 17.

Figs. 19 and 20 are modified details of the bearing shown in Figs. 17 and 18.

Fig. 21 illustrates diagrammatically the construction of a segmental ring adapted to be fitted in the outer member of a film-lubricated bearing.

Fig. 22 is an axial section of the segmental ring shown in Fig. 21.

Figs. 23, 24 and 25 are cross sections of modified segmental rings.

Figs. 26, 27 and 28 are respectively axial sections of the rings shown in Figs. 23, 24 and 25.

Referring in the first instance more particularly to Figures 1 to 4 inclusive of the drawings, the numerals 1 and 2 designate respectively a journal which may be rotated in either direction and an outer bearing member concentric with the journal 1. The outer bearing member 2 which may be fixed or stationary, or movable relatively to the journal 1, the latter being stationary, is shown as split or divided into two parts on a diametral plane, see Figs. 1 and 2, but the same may be of one-piece construction and the outer perimeter or boundary may be of other than the simple cylindrical form illustrated, if so desired.

Located about the journal 1 is an annular series of floating pads $P_1$ which coact on their inner faces with the journal 1 and on their outer faces with a ring 3 disposed concentrically about the journal 1.

Figure 1:
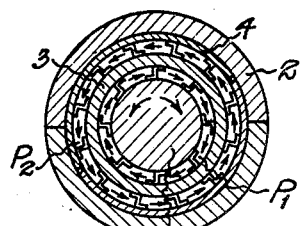
Fig. 1 is a transverse section of a film-lubricated bearing according to the invention, wherein two annular series of pads are spaced concentrically by an intermediate ring and wherein the pads comprising one series are oriented for rotation in one direction and the pads in the other series are oriented for rotation in the opposite direction.
Figure 2:
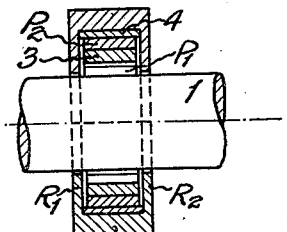
Fig. 2 is an axial section of the bearing shown in Fig. 1.
Figure 3:
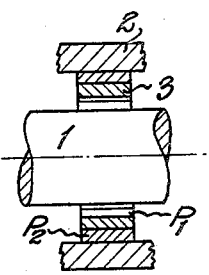
Figs. 3 and 4 are axial sections showing modified details of the bearing illustrated in Figs. 1 and 2.
Figure 4:
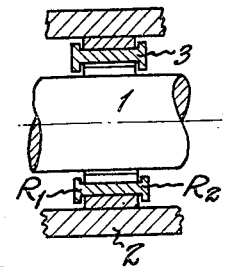

Surrounding the ring 3 is an annular series of pads $P_2$ which coact on their inner faces with the ring 3 and on their outer faces with the adjacent periphery of a liner or shell 4 fitted in the outer bearing member 2, as shown in Figs. 1 and 2. The liner 4 is comprised of two halves or similar sections which together form a continuous cylindrical surface against which the pads $P_2$ rotate. The liner 4, which is preferably made of elastic material, will be referred to hereinafter in greater detail. If the outer bearing member 2 be made as a single piece or unit, the liner 4 may be dispensed with, in which latter case the pads $P_2$ contact directly with the bearing member 2, see Figs. 3 and 4.

As indicated by arrows in Fig. 1, the pads $P_1$ of the inner series are oriented for rotation of the journal 1 in one direction, while the pads $P_2$ are oriented for rotation of the journal in the opposite direction, so that if the direction of rotation of the journal is such as to suit the functioning of the pads $P_1$ and pads $P_2$ will be ineffective or approximately so, whereas if the rotation of the journal sets the pads $P_2$ in action, the pads $P_1$ will be inactive or substantially so.

To maintain the pads $P_1$ and $P_2$ and the ring 3 in circumferential alignment, rims or flanges $R_1$ and $R_2$ may be provided on the outer bearing member 2, thus forming a channel, of somewhat greater width than the pads and ring, in which the same may freely rotate, see Fig. 2. Alternatively, the ring 3 may be provided with internal and external rims or flanges $R_1$ and $R_2$ (see Fig. 4) to maintain the pads $P_1$ and $P_2$ in circumferential alignment, appropriate working clearances being provided between the sides of the pads and the adjacent rims.

In the form of the invention just described with reference to Figs. 1 to 4, the pads $P_1$ and $P_2$ are differentiated in position and function, the same being disposed in concentric annular series in the same plane and arranged in two groups adapted respectively for opposed directions of rotation.

The pads may also be differentiated in function and in position by arranging the same in multiple annular series located in spaced relation axially, some of the series being adapted for rotation in one direction and the others for rotation in the reverse direction. Such an arrangement of multiple pad series is shown in Figures 5, 6 and 7, in which three series of pads $P_1$, $P_2$ and $P_3$ are provided, the outer series $P_1$ and $P_2$ being arranged to face in the same direction, see Fig. 6, while the central series $P_3$ is arranged to face in the opposite directions, as shown in Fig. 7. Accordingly, when the direction of rotation of the journal 1 is suited to the pads $P_1$ and $P_2$, the same become effective in forming wedge-shaped pressure-films of lubricant to support the load, while the central series $P_3$ remains inactive, or comparatively so. Conversely, if the direction of rotation of the journal be reversed, the pads $P_3$ become operative to form pressure-films, while the pads $P_1$ and $P_2$ remain relatively inactive.

The rings of pads $P_1$, $P_2$, $P_3$ are respectively housed in circumferential channels, $C_1$, $C_2$, $C_3$, which are formed around the interior of the bearing member 2, the pads of each series making working contact by their inner faces on the peripheral surface of the journal 1, and by their outer faces on the cylindrical surfaces which form the outer walls of the channels. The channels $C_1$, $C_2$ and $C_3$ are made somewhat wider than the axial widths of the respective pads $P_1$, $P_2$, and $P_3$, in order that the same may rotate with requisite freedom in the channels.

The sides of the channels $C_1$, $C_2$ and $C_3$ form rims or flanges $R_1$, $R_2$, $R_3$ and $R_4$, the rims $R_2$ and $R_3$ being located on opposite sides of the central channel $C_3$ and separating the same from the lateral channels $C_1$ and $C_2$. The rims $R_1$, $R_2$, $R_3$ and $R_4$ maintain the pads in circumferential alignment and prevent contact of adjacent series of pads as well as locating the same axially with respect to the journal 1.

It is to be noted that at starting and before the formation of wedge-shaped films of lubricant has taken place, all of the pads $P_1$, $P_2$ and $P_3$ will support the load, the lubrication then being in the manner known as "boundary lubrication."

In Fig. 5 three annular series of pads are provided, but it will be understood that the series may be increased in number and the order of the groups of series for opposite rotations may be varied to suit requirements. Moreover, the pads forming the different annular series may vary in dimensions, the pads in some of the series being of greater size than the pads in other series. Furthermore, the numbers of pads comprising the several series may vary, the pads in some series being more numerous than in other series. Such variable arrangements in size and number of pads will be apparent from Figs. 5, 6 and 7, from an inspection of which it will be noted that the pads $P_3$ of the central series are of greater axial and circumferential dimensions and of less number than the pads $P_1$ and $P_2$ of the outer annular series.

In some cases, a bearing may have one or more annular series of pads in which the same are alternatively faced about or disposed oppositely to adapt the bearing for rotation in either direction. An annular series of pads $P_1$ and $P_2$ arranged in this manner is shown in Figs. 8 and 9, and it will be seen that the pads are disposed in two groups, every second pad $P_1$ being of one group and adapted for rotation in one and the same direction (as indicated by arrows) while the intervening pads $P_2$ of the other group, are suited for rotation in the opposite direction, as shown by opposed arrows.

An apparatus for facilitating the assembly in their working positions of the pads of bearings, such as are shown in Fig. 5 and Figs. 13 to 15 hereinafter referred to, is illustrated in Figs. 10, 11 and 12. It consists essentially of a tube 5, whose outer diameter is equal to that of the journal 1. A series of rectangular openings, or ports, $W_1$, $W_2$, $W_3$ is cut through the wall of the tube, equal in number to the annular series of pads, this being assumed to be three in the present instance. The ports are slightly larger in each direction than the pads of the bearing, and the middle circumferential line of each port coincides with the corresponding middle line of the pads in the assembled bearing. In the circumferential direction, each port is staggered with respect to the next adjacent port or ports by an arc which is preferably one-half, or an odd multiple of one-half, of the arc subtended by each pad.

As the first operation in assembling the pads in the outer bearing member 2, this being done before the journal 1 is inserted, one pad of each annular series is laid in position on the lower inner surface of the bearing member between the rims R R. The tube 5, with its ends open, is then inserted into the bore and allowed to rest on these pads with the port at, say, its left end uppermost. Next, the annular series of pads at the left end are each inserted in turn through the left end of the tube, pushed outward through the port, and allowed to slide downwards between the outer surface of the tube 5 and the inner surface of the bearing member 2 until all the pads of the series, except one, have been thus put in place. The remaining pad is then pushed up through the port and held in position against the inner surface of the bearing member while the tube is rotated about its axis through an arc corresponding to the angular spacing of the ports. By reference to Fig. 11, which shows in full lines a transverse section through the series of pads which has been thus assembled, the tube 5 having been rotated as described, it will be seen that all the pads which have been inserted are supported by the tube either on the whole, or at least on a half, of their surface. It will also be noted that the port next to the left end of the tube is now in its uppermost position. The operation of assembly just described for the left series of pads can therefore now be exactly repeated for the next series, and similarly for the other series in turn.

After all the pads have been thus placed in position in the bearing member 2, the assembly tube 5 and the journal 1 are brought into axial alignment, and into end-to-end contact, with each other, and the bearing member 2 together with the pads pushed off the tube and on to the journal, thus completing the assembly.

In order to prevent error or inaccuracy in effecting the step-by-step angular rotation of the assembly tube 5 as above described, the tube may be provided at one of its ends with a pin 6, arranged to engage at each step with one or other of a series of notches 7, formed in the bearing member 8 and disposed at suitable equal angular distances, in a manner which will be readily understood.

If it should be desired to complete the assembly of the pads in the bearing member 2 without proceeding forthwith to mount the same on the journal 1, plates 8, 8a may be clamped, as by a through-bolt, 9, over the ends of the assembly tube and the bore of the bearing member 2. The bearing member 2, fitted with bearing-pads, can then be transported or laid aside in storage, without risk of the bearing pads being detached or displaced. When the assembling unit is used in this way, engagement of a pin 6 with a notch 7 serves to prevent the tube 5 from being accidentally rotated so as to allow any of the pads to fall through the ports $W_1$, $W_2$ and $W_3$.

Referring now to Figs. 13, 14 and 15, the crank pin 10 is formed integrally at one end with a crank web 11 and crankshaft journal 12, while at the other end it is detachably mounted in a separate crank web 13 formed integrally with a journal 14 located in coaxial alignment with the journal 12. The connecting-rod big-end 15 is formed integrally with the master-rod 16, and with lugs, as 17, to which the secondary connecting rods are articulated.

The floating bearing pads are arranged in three annular series or rings $P_1$, $P_2$, $P_3$, the middle plane of the middle ring $P_2$ preferably coinciding with the middle plane of the master connecting-rod, with the annuli $P_1$ and $P_3$ symmetrically arranged on each side of it.

The motion of the crankshaft is uni-directional, and in consequence the pads $P_1$, $P_2$ and $P_3$ of the three annular series are all disposed in the same way, as is shown in the cross-section Fig. 14 and the developed view Fig. 15, to form wedge-shape oil films between their inner faces and the crank pin 10 and between their outer faces and the big end 15.

The annular series of pads $P_1$, $P_2$ and $P_3$ are of equal width and are accommodated in circumferential channels $C_1$, $C_2$ and $C_3$ formed in the inner periphery of the big end 15.

In machining the channels $C_1$, $C_2$, $C_3$ two annular rims $R_1$, $R_2$ are formed between them, and two similar rims $R_3$, $R_4$ between the channels $C_1$ and $C_3$ respectively and the outer faces of the big end 15. The faces of these rims are smoothly finished, and the width of each channel in the axial direction is made greater than the width of the pads housed therein by a working clearance, so that the pads are free to revolve in the channels but are prevented from changing their alignment therein to an extent sufficient to impair the relations of their working surfaces to the surfaces of the crank pin and channel. Alternatively, as indicated by dotted lines in Fig. 13, the annular rims $R_1$, $R_2$, $R_3$, $R_4$ may be in the form of separate rings fitted into grooves formed in the big end.

The inner radii of each of the rims $R_1$, $R_2$ is made greater than the inner radii of the pads, so as to form two annular spaces c c around the crank pin 10 between the series of pads $P_1$, $P_2$, and $P_3$, respectively. The inner radii of the rims $R_3$, $R_4$ are also greater than the radii of the pads, but preferably less than those of the rims $R_1$ and $R_2$.

According to a common practice, the lubricant for the bearing is introduced under pressure through holes 18, 19 drilled respectively in the crank journal 14 and web 13, into the chamber 0 bored axially in the crank pin 10. From the chamber 0 it is delivered by holes 20, 21, drilled radially in the crank pin to the annular spaces $c$ $c$ from which it flows over the working surfaces of the pads, and through the circumferential spaces between them to the ends of the crank pin 10 where it may be allowed to escape between the crankwebs 11 and 13 and the end surfaces of the big end 15 into the crank-case of the engine, lubricant being also passed on through hole 12a to other lubrication points. Rings 22, 23, fitted between the end surfaces of the big end 15 and the corresponding surfaces of the crank-webs 11, 13, may serve both to limit the quantity of lubricant which is allowed thus to escape to the crank-case and to serve as thrust rings, resisting forces acting in an axial direction between the big end and the crank-webs. When the machine is stationary the lower portions of the channels $C_1$, $C_2$, $C_3$ act as small reservoirs of oil in which portions of two or more pads rest. This oil is available for lubricating the pads at starting.

In Fig. 15 which shows portions of all three annular series of pads $P_1$, $P_2$, $P_3$ developed into the plane of the drawing and seen from the exterior, the positions of the lubricating spaces $c$ $c$ relatively to the holes, 20, 21, in the crank-pin, and to the pads are clearly shown. The motion of the pads in their rotation around the crankpin is indicated by the short arrows $a$, and the more rapid rotation of the big end (unseen in this view) by the longer dotted arrow A.

One of the purposes of the arrangement of a multiple series of floating pads in the manner described in connection with Figs. 13 and 14 is illustrated in Fig. 16, in which are shown diagrammatically the essential elements of the bearing already described, viz. the crank-pin 10, making lubricated contact with the inner faces of the three rings of pads, $P_1$, $P_2$, $P_3$, and the big end 15, whose inner cylindrical surface (divided into three sections by the rims $R_1$, $R_2$), makes lubricated contact with the outer surfaces of the pads. The films of oil between the inner and outer surfaces of the pads of each series and the corresponding surfaces of the crank-pin and big end are indicated in section, with exaggerated thickness, respectively as $f_1$, $f_2$, $f_3$, and $F_1$, $F_2$, $F_3$.

As is fully explained in the specification of the Patent No. 2,250,546 already referred to, each floating pad forms between each of its surfaces and the surfaces with which it coacts films of lubricant which are of thicknesses related inversely to the load imposed on the pad, and which exert fluid pressures equilibrating that load.

If in a crank pin bearing of the kind herein described the crank-pin and other parts were perfectly rigid, the total load L exerted upon the bearing, being mainly due to the centrifugal and accelerative forces exerted by the big end 15 together with the connecting-rods and other parts attached thereto, would act downwardly (as shown in Fig. 16), upon the crank-pin 10, and would be supported chiefly and to an equal degree by the pressure films on those pads of each series $P_1$, $P_2$, $P_3$ which are momentarily between the upper part of the surface of the crank-pin 10 and the inner surface of the big end. The films on the surfaces of these pads would thus tend to become of smaller thickness than those on pads momentarily at other parts of the circumference. In practice, however, the crank-pin necessarily bends under the load L, so that its upper surface becomes concave longitudinally, and its lower surface convex, as shown exaggerated in Fig. 16, while the big end 15, which is relatively rigid retains the cylindrical form of its inner surface substantially unchanged. Thus the thicknesses of the lubricating films of the pads in the upper part of the annular series $P_2$ are increased relatively to the films of the corresponding part of the series $P_1$ and $P_3$ and the former films exert less pressure than the latter. Simultaneously the films of the pads in the lower part of the series $P_2$ become relatively thin and exert greater pressures (upward upon the crank-pin), than those of the other series. It will readily be seen that the resulting differentiation of film pressures between the middle and the end portions of the bearing tends to the diminution of the bending moment on the crank-pin due to a given load L, while, at the same time, each annular series of pads, being protected by the rims, R, from any interference by the adjacent series, preserves its freedom of rotation and system of pressure reactions, independently of the others.

Referring now to the application of the invention to a journal which is formed integrally with crank-webs, as shown in Figs. 17 and 18, or which for other reasons necessitates the division of the connecting-rod big end, or other outer member of the bearing, on a diametral plane, it is well known that the assembly of such separate outer members with sufficient accuracy to form an efficient, truly cylindrical, outer bearing member presents very great difficulties.

The formation of a truly cylindrical surface on the outer, as well as the inner, load-carrying member is a special requirement of bearing-pads constructed according to the present invention, since they make sliding contact with both of these members. A special means for producing such a surface and eliminating the effect of small irregularities due to the formation of the outer member in two parts has already been mentioned in connection with Figs. 1 and 2 and will now be described in further detail with reference to Figs. 17 to 28.

According to the construction shown in Figs. 17 and 18, the crank-pin 10 is formed integrally with the crank-webs 24 and 25, which may also be integral with the crank-shaft journals 26 and 27. The connecting-rod big end is divided on a plane through the axis of the crank-pin, the cap 28, being attached to the connecting-rod 29 by bolts 30 according to a usual practice. After assembly these two parts are accurately bored to the cylindrical surfaces 31, 31a of equal diameter. Between, and on each outer side of, these surfaces rims $R_1$, $R_2$, $R_3$ are formed as already described in connection with Fig. 13 but, in the present instance, by way of example, only three rims are shown instead of four as in that figure. Alternatively, the rims may be separate rings formed in halves and fitted into peripheral grooves in the big end, as is indicated by the central rim $r_1$ shown in Fig. 20. Between the rims $R_1$, $R_2$ and $R_1$, $R_3$ respectively are fitted two rings $E_1$ and $E_2$, which form the bearing surfaces for the outer faces of the pads of the bearing. Each of these rings consist of two parts meeting on an axial plane which is preferably at an angle to the plane of division of the big end, see Fig. 18. The mode of construction of these rings is illustrated diagrammatically in Figs. 21 and 22. As shown in these figures, each ring E, which is of tempered steel, or other hard and elastic material is initially machined, as shown by the dot-and-dash circles $E_a$, with an external cylindrical surface larger than the bore of the big end.

The internal surface is also cylindrical, the ring being formed with the required, uniform, final thickness. Circumferential portions $g_a$, $g_b$ of total length hereinafter defined are then removed as indicated. For assembly in the big end the respective ends of the ring segments so formed are then brought closer together as indicated by the even-dotted circles $E_b$ in Fig. 21, and the two pairs of meeting ends are entered into the cap-half, and rod-half, of the big end respectively, the bolts 30 being slackened sufficiently to allow this to be done. Finally the bolts 30 are tightened up so as to draw the meeting ends of the ring segments into contact, as shown at $E_c$ by the full lines in Figs. 21, 23–25, at the same time as the cap-half is brought into contact with the rod-half of the big end, thus closing the gaps $g_a$ and $g_b$.

As will be seen from Fig. 21, the gaps $g_a$, $g_b$, are cut in such a manner that the ends which are formed on the two ring segments are not exactly radial, but diverge slightly from the radius away from the middle plane of each gap. Thus when the gaps are closed on assembly of the parts as hereinbefore described, the ends of the ring segments are brought into contact at their inner edges only, and a V-shaped gap is left between their outer portions, as also seen in Figs. 18, 21, 23–25.

The purpose of this mode of construction of the elastic rings E is to ensure that their inner surfaces, which form, as already explained, the bearing surfaces for the outer faces of the pads of the bearing, shall form continuous and truly cylindrical surfaces. It will be understood that, when the rings are assembled in the big end, and the ends of the ring segments forced into contact with each other as described, a circumferential compressive stress is produced throughout the ring, accompanied by radially directed pressures, of much less intensity than the circumferential compression, between the outer surface of the ring and the internal surface of the big end, and by bending stresses acting in transverse planes throughout the ring, due to its having been constrained into a cylindrical form (the bore of the big end) of smaller radius than that to which it was initially formed. The purpose of the oblique circumferential ends of the ring segments is to render these bending stresses, as well as the radial pressures acting between the rings and the bore of the big end as nearly as possible uniform over the circumference, so that both the rings and the bore of the big end may assume and retain truly cylindrical forms. The precise dimensions to be given to the various parts to bring these results about must be calculated in each instance by the application of the known properties of elastic bodies, or, alternatively, determined by trial. It will be sufficient for the present purpose to point out the following considerations. Firstly, the circumferential compressive stress in the ring depends directly on the difference between the initial total circumferential length of the ring segments after machining and their corresponding total length after they are bolted up in the big end. The total length of the gaps cut in the rings is therefore readily calculated from their initial and final radii, the elastic constant of the material and the desired intensity of the compressive stress. Secondly, the bending stresses in the ring segment also, in a general sense, depend on the difference between the initial and final radii of its cylindrical surfaces. At the meeting ends of the segments, however, owing to the actual contact being only at, or close to, the inner edge, the bending moment in each ring is equal to the product of the contact pressure and half the radial thickness of the ring. Since the bending moment is required to be uniform throughout the ring, the contact pressure, or alternatively the ring thickness, is thus determinable. To illustrate the importance of these considerations for the purposes in view, it may be remarked that if, for instance, the mutual contact of the ring segments were at the middle point of their thickness instead of being at their inner edges, there would be no bending moment on the segments at or near their ends, and consequently the curvature of that part of the bearing surface would remain that to which the rings were initially machined, and would thus be different from the curvature existing elsewhere in the rings after their assembly in the bearing.

As shown in Fig. 19, the rings $E_1$, $E_2$ instead of having plain cylindrical internal surfaces, may be formed with inwardly projecting rims $r_1$, $r_2$ on each of their sides, these rims taking the place of, and serving the same purposes as the rims $R_1$, $R_2$, $R_3$ formed in the big end according to Fig. 17. Alternatively again, a single ring, E, either plain or furnished with an inwardly projecting rim R, on each of its sides, as shown in Figs. 25 and 23, may replace the two rings shown in Figs. 17, 19 and 20. Furthermore, the rings $E_1$, $E_2$ may be formed with rims $r_2$ at their outer sides, while a separate rim $r_1$ made in halves and fitting a groove in the inner periphery of the big end, may be interposed between the inner sides of the rings, see Figure 20.

In all cases the rings are divided on a diametral plane, and their two halves are formed with bevelled circumferential ends as hereinbefore described, but when inwardly projecting rims are used, the mutual contact of the half-rings may extend, as shown in Fig. 25, over the whole of the circumferential ends of these rims as well as over the mating edges of the ends of the cylindrical portions of the rings, as shown in Fig. 25.

When the outer bearing faces of the floating pads are spherical, according to some constructions described in the cited prior Patent No. 2,250,546 the divided elastic rings must be formed with corresponding concave spherical internal surfaces $E_d$, instead of cylindrical surfaces as hereinbefore described.

The external surfaces of the rings may then, according to circumstances, either be also spherical, as shown at $E_e$ in Fig. 26 (the bore of the big end being likewise spherical to fit them), or may be cylindrical as shown at $E_f$, to fit the rings shown in Figs. 24 and 27, the mutual contact of the circumferential ends of the component halves of each ring being, in either case, upon the inner edges only.

We claim:

1. A film-lubricated bearing comprising load-carrying members relatively rotatable in opposite directions, and a plurality of annular series of freely rotatable floating pads interposed between the load-carrying members, the pads of at least one of said series facing in one direction to transmit loads in one direction of relative rotation between said members, and the pads of at least one other of said series facing in the opposite direction to transmit loads in the opposite direction of relative rotation between said members, said pads having similar relatively offset slidable bearing surfaces on their opposite sides.

2. A film-lubricated bearing comprising load-carrying members relatively rotatable in opposite directions, and a plurality of radially spaced annular series of freely rotatable floating pads interposed between the load-carrying members, the pads of at least one of said series facing in one direction to transmit loads in one direction of relative rotation between said members, and the pads of at least one other of said series facing in the opposite direction to transmit loads in the opposite direction of relative rotation between said members, said pads having similar relatively offset slidable bearing surfaces on their opposite sides.

3. A film-lubricated bearing comprising load-carrying members relatively rotatable in opposite directions, and a plurality of axially spaced annular series of freely rotatable floating pads interposed between the load-carrying members, the pads of at least one of said series facing in one direction to transmit loads in one direction of relative rotation between said members, and the pads of at least one other of said series facing in the opposite direction to transmit loads in the opposite direction of relative rotation between said members, said pads having similar relatively offset slidable bearing surfaces on their opposite sides.

4. A film-lubricated bearing comprising load-carrying members relatively rotatable in opposite directions, a plurality of annular series of freely rotatable floating pads interposed between the load-carrying members, the pads of at least one of said series facing in one direction to transmit loads in one direction of relative rotation between said members, and the pads of at least one other of said series facing in the opposite direction to transmit loads in the opposite direction of relative rotation between said members, said pads having similar relatively offset slidable bearing surfaces on their opposite sides, and means for retaining the pads of each series in circumferential alinement.

5. A film-lubricated bearing comprising a pair of load-carrying members relatively rotatable in opposite directions, an annular series of freely rotatable floating pads facing in one direction and in contact with one of said members to transmit load in one direction of relative rotation between said members, a second annular series of freely rotatable floating pads facing in the opposite direction and in contact with the other member to transmit load in the opposite direction of relative rotation between said members, and a ring interposed between the two series of pads with which both series of pads are in contact, said pads having similar relatively offset slidable bearing surfaces on their opposite sides.

ANTHONY GEORGE
    MALDON MICHELL.
AUGUST JOHN SEGGEL.

REFERENCES CITED

The following references are of record in the file of this patent:

UNITED STATES PATENTS

| Number | Name | Date |
|---|---|---|
| 2,078,713 | Hudson | Apr. 27, 1937 |
| 2,250,546 | Mitchell et al. | July 29, 1941 |

FOREIGN PATENTS

| Number | Country | Date |
|---|---|---|
| 549,301 | Germany | Apr. 25, 1932 |
| 547,306 | Great Britain | Aug. 21, 1942 |